United States Patent [19]

Lee et al.

[11] 4,437,113

[45] Mar. 13, 1984

[54] ANTI-FLUTTER APPARATUS FOR HEAD MOUNTED VISUAL DISPLAY

[75] Inventors: David R. Lee; Robert B. McCreary, both of Mesa, Ariz.

[73] Assignee: The United States of America as represented by the Secretary of the Air Force, Washington, D.C.

[21] Appl. No.: 332,894

[22] Filed: Dec. 21, 1981

[51] Int. Cl.³ .............................................. H04N 5/74
[52] U.S. Cl. ...................................... 358/93; 358/104; 358/222; 358/231; 358/250
[58] Field of Search ................... 358/87, 93, 104, 109, 358/222, 250, 231, 232, 233, 235, 236, 901

[56] References Cited

U.S. PATENT DOCUMENTS

| | | | |
|---|---|---|---|
| 3,230,819 | 1/1966 | Noxon | 358/250 |
| 3,446,916 | 5/1969 | Abel et al. | 358/901 |
| 3,549,800 | 12/1970 | Baker | 358/231 |
| 4,315,240 | 2/1982 | Spooner | 358/104 |

Primary Examiner—Joseph A. Orsino, Jr.
Attorney, Agent, or Firm—Donald J. Singer; William Stepanishen

[57] ABSTRACT

An anti-flutter apparatus for a head mounted visual display having servo-controlled reflective surfaces to provide corrections to head rotations which occur before a visual scene generation system is able to respond to the head movement.

5 Claims, 1 Drawing Figure

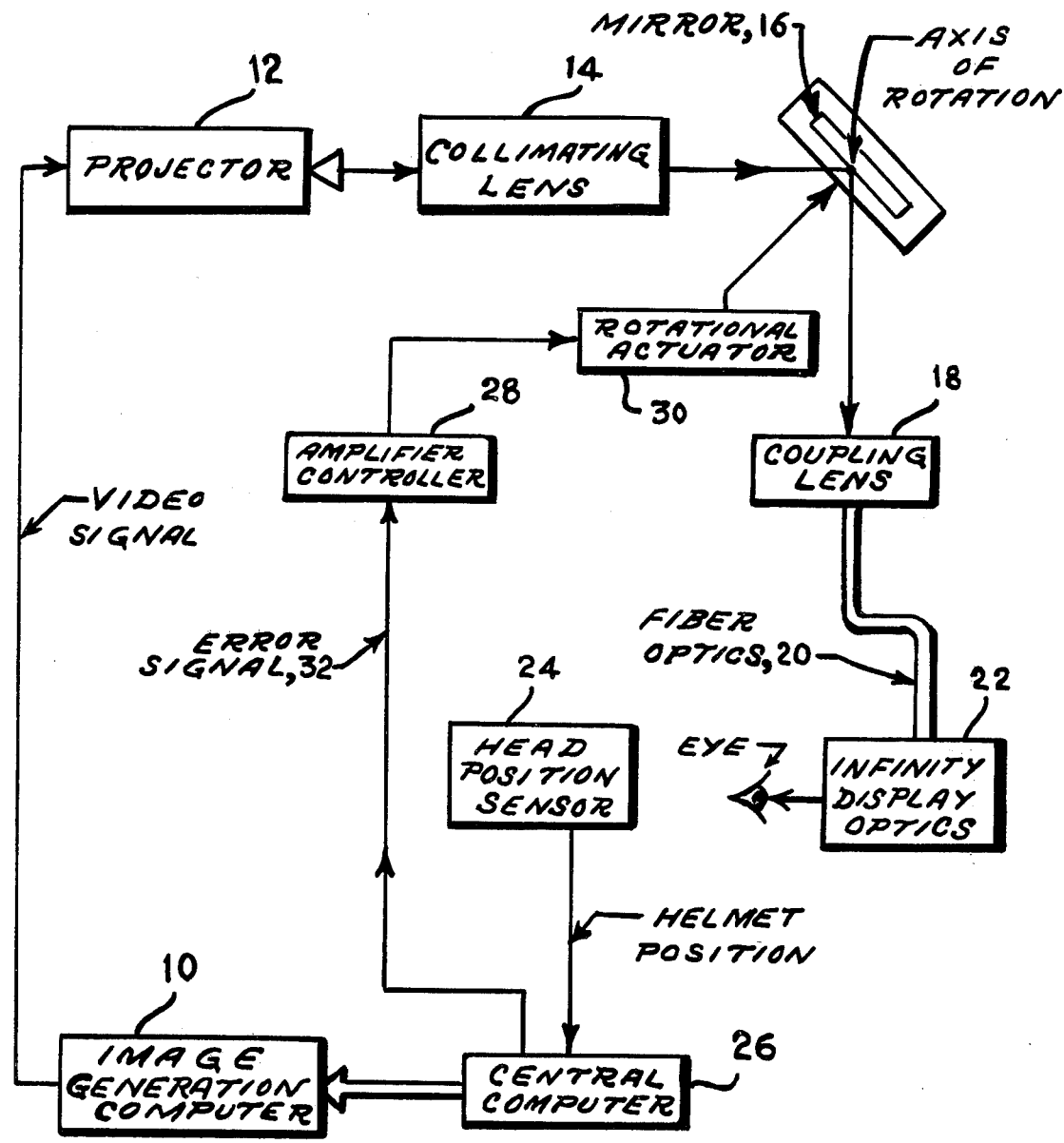

ANTI-FLUTTER APPARATUS FOR HEAD MOUNTED VISUAL DISPLAY

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to head mounted display devices, and in particular to an anti-flutter apparatus for these devices.

Systems have been proposed for remotely viewing a scene by means for a closed-circuit television system or the like. Some of these prior art systems have included means for remotely controlling the remote location. Attempts have been made in the past to coordinate the movement or control of the remote pickup with the movement of the remote observer's eyes or head in order to inject an element of realism into the remote presentation. These systems of the prior art have the disadvantage that the movement of the observer is unduly restricted, the field of view at the remote location is severely limited, the method of control is unduly complex and/or the nature of the display on the indicator is such that the observer lacks the subjective feeling of being present at the remote location or scene pickup. These and other disadvantages of prior art systems have made them inapplicable to such complex tasks as landing a high-speed aircraft either from a point within the plane or at some remote location on the ground controlling a highly maneuverable submarine, traffic surveillance, etc.

Head mounted infinity display visual systems which present a new scene at discrete intervals develop an oscillation (flutter) problem if the scene display is repeatedly updated to display a stationary image with respect to the earth. The problem arises when the visual system is trying to react to head position rotation by generating new scenes at discrete intervals. The displayed scene moves with the head until update time whereupon the scene appears to jump back to its correct position with respect to the earth. For example, if the scene display was being updated by a computer image generator 30 times per second, and the head was turning horizontally at a rate of 30 degrees per second, then the perceived flutter of the image would have an amplitude of up to 1 degree and a frequency of 30 Hz. Another problem which the present invention greatly reduces is the transport delay or lag between head movement and the display system response.

SUMMARY OF THE INVENTION

The present invention utilizes a servo actuator unit to control a mirror which is placed in the optical path of an image generating system to provide anti-flutter corrections for horizontal head rotation in a real time training simulator. The computer generated imagery is projected via a mirror system to a head mounted display system. A central computer which controls the image generating system, generates an error signal which is derived from a head position sensor and the relative position of the generated scene. The error signal is applied to the servo actuator unit to correct the visual image for the measured head position.

It is one object of the present invention, therefore, to provide an improved anti-flutter apparatus for a head mounted visual display.

It is another object of the invention to provide an improved anti-flutter apparatus utilizing a servo-controlled mirror or reflective surface.

It is still another object of the invention to provide an improved anti-flutter apparatus wherein the display image is stationary with respect to the earth for horizontal head rotation.

It is yet another object of the invention to provide an improved anti-flutter apparatus wherein the visual scene generating system is correlated in response to head rotations.

It is still a further object of the invention to provide an improved anti-flutter apparatus wherein the visual scene is updated in response to a new head position.

These and other advantages, objects and features of the invention will become more apparent after considering the following description taken in conjunction with the illustrative embodiment in the accompanying drawings.

BRIEF DESCRIPTION OF THE DRAWING

The sole FIGURE is a block diagram of the anti-flutter apparatus for a head mounted visual display according to the present invention.

DESCRIPTION OF THE PREFERRED EMBODIMENT

Referring now to the sole FIGURE, there is shown an anti-flutter apparatus for a head mounted visual display utilizing an image generation computer 10 to provide a video signal that is representative of a predetermined visual scene. The video signal is supplied to the video projector unit 12 wherein the video signal is utilized to project a visual image to the collimating lens 14. The collimating lens 14 collimates and focuses the visual image on the mirror unit 16 from which the light rays are reflected to the coupling lens 18. The coupling lens 18 reimages the scene and inserts the image into the fiber optic bundle 20. The visual image is coupled by the fiber optic bundle 20 to the infinity display optics unit 20 which focuses the image at infinity. The infinity display optics unit 20 projects the visual scene to the eye of the user.

A head position sensor 24 which may be mounted on a helmet that is worn by the user, is utilized to generate a helmet position signal. The central computer unit 26 receives the helmet position signal which provides references data of the actual head position with respect to some predetermined reference point. The central computer unit 26 transmits an image generation signal that corresponds to the helmet position signal to the image generation computer unit 10. The image generation computer unit 26 will generate a video image signal in response to the image generation signal. The image generation computer unit 10 requires approximately 0.1 seconds to generate the video image signal, therefore, with respect to the helmet position signal, at the time of the generated video image signal, there is a time discrepancy of approximately 0.1 seconds. In other words, the generated video image is correct for a head position that was measured 0.1 seconds ago. At the completion of the generated video image by the image generation computer unit 26, the central computer unit 26 recalls the helmet position signal which is equal to the head position at the time the video image generation was initiated. The helmet position signal which corresponds to the generated viedo image, is subtracted by the central computer unit 26 from the currently generated actual helmet position signal to provide an error signal 32. The amplifier/controller unit 28 responds to the error signal 32 by applying an error correction signal to rotational actuator unit 30. The rotational actuator unit 30 which is connected by any suitable conventional means to mirror unit 16, rotates it about its axis of rotation. The rotational acruator unit 30 responds to the error correction signal by rotating the mirror from its neutral position in proportion to the error signal 32. The rotation of the mirror unit 16 causes a displacement in the image formation in the coupling lens 18, thereby causing a subsequent change in the image display in the infinity display optics unit 22. Thus, the visual scene that is presented to the eye will correspond to the actual head rotation.

Although the invention has been described with reference to a particular embodiment, it will be understood to those skilled in the art that the invention is capable of a variety of alternative embodiments within the spirit and scope of the appended claims.

What is claimed is:

1. An anti-flutter apparatus for a head mounted visual display comprising in combination:
   an image generation means for generating and projecting a visual image,
   a collimating means to receive said visual image from said image generation means and to collimate said visual image,
   a reflecting means to directly receive said visual image from said collimating means, said reflecting means is centered about its axis of rotation to reflect said visual image therefrom,
   a light transmission means to receive said visual image from said reflecting means,
   a display means which is directly connected to said light transmission means to receive said visual image from said light transmission means, said display means displaying said visual image to provide a scene,
   a position sensor means to generate a first position signal, and a second position signal,
   a computing means to receive said first position signal, said computing means generating an image signal in response to said position signal, said image signal being sent to said image generation means, said computing means generating an image position signal, said computing means subtracting said image position signal from said second position signal to generate an error signal,
   an amplifier/controller means receiving said error signal and generating a correction signal in response thereto, and,
   an actuator means operationally connected to said reflecting means, said actuator means receiving said correction signal, said actuator means rotating said reflecting means about its center of rotation in response to said correction signal.

2. An anti-flutter apparatus as described in claim 1 wherein said image generation means comprises:
   an image generation computer to generate video image signals, and
   a video projector to receive said video image signals, said video projector generating a visual image in response to said video image signals.

3. An anti-flutter apparatus as described in claim 1 wherein said reflecting means comprises a plane mirror.

4. An anti-flutter apparatus as described in claim 1 wherein said light transmission means comprises:
   a coupling lens to receive said visual image, said visual image comprising light signals, and,
   a fiber optics transmission bundle to receive said light signals, said fiber optics transmission bundle being connected between said coupling lens and said display means.

5. An anti-flutter apparatus as described in claim 1 wherein said display means comprises an infinity display optics unit.

* * * * *